US012679160B2

(12) United States Patent
    Lee

(10) Patent No.: US 12,679,160 B2
(45) Date of Patent: Jul. 14, 2026

(54) DEVICE AND METHOD FOR CONTROLLING SUSPENSION ACCORDING TO STEERING MODE

(71) Applicant: HL MANDO CORPORATION, Gyeonggi-do (KR)

(72) Inventor: Kyungtack Lee, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 30 days.

(21) Appl. No.: 18/762,504

(22) Filed: Jul. 2, 2024

(65) Prior Publication Data

US 2025/0178396 A1    Jun. 5, 2025

(30) Foreign Application Priority Data

Dec. 1, 2023    (KR) ........................ 10-2023-0172556

(51) Int. Cl.
    *B60G 17/016*        (2006.01)
(52) U.S. Cl.
    CPC .... *B60G 17/0163* (2013.01); *B60G 2400/051* (2013.01)

(58) Field of Classification Search
    CPC ........... B60G 17/0162; B60G 17/0163; B60G 17/0195; B60G 17/018; B60G 2400/051; B60G 2800/01
    USPC ......................................................... 701/37
    See application file for complete search history.

(56) References Cited

U.S. PATENT DOCUMENTS 4,827,416 A * 5/1989 Kawagoe ............. B60G 17/016 280/5.513

* cited by examiner

*Primary Examiner* — Lindsay M Low
*Assistant Examiner* — Omar Morales
(74) *Attorney, Agent, or Firm* — WOMBLE BOND DICKINSON (US) LLP

(57)                ABSTRACT

A device and method of controlling suspension settings according to a steering mode of a vehicle determines an attitude of a vehicle to easily secure a driver's field of view depending on various steering modes of the vehicle and determines a roll angle or pitch angle of the vehicle accordingly to control a suspension, so that a driver's anxiety or uncomfortableness caused by steering modes may be eliminated by securing the driver's field of view, and a driver's ride quality may be improved by allowing the driver to identify driving conditions that vary depending on a driving mode from a driver's view.

18 Claims, 5 Drawing Sheets

(a)  (b)

(a)          (b)          (c)          (d)          (e)          (f)

DEVICE AND METHOD FOR CONTROLLING SUSPENSION ACCORDING TO STEERING MODE

CROSS-REFERENCE TO RELATED APPLICATION

This application claims priority to and the benefit of Korean Patent Application No. 10-2023-0172556, filed on Dec. 1, 2023, the disclosure of which is incorporated herein by reference in its entirety.

BACKGROUND

1. Field

The present disclosure generally relates to suspension control of a vehicle, and particularly to a device and method for suspension control according to a steering mode of a vehicle capable of four-wheel independent drive and steering.

2. Discussion of Related Art

Suspensions connecting a vehicle body and wheels may be devices necessary to absorb road shock and secure tire traction at the same time. The suspension plays a role in absorbing shock generated while the vehicle is traveling on a road before the shock is transmitted to the vehicle body or an occupant, thereby reducing fatigue of the vehicle body to increase durability and preserving ride quality of the occupant.

In recent years, attempts to make chassis parts regarding driving, steering, and braking, including the suspension into a single part have been made. That is, since each wheel is able to be independently driven and steered, instead of being connected by an axle, movements that are different from vehicles in the related art are possible.

FIG. 7 shows various examples of a steering mode of a vehicle capable of four-wheel independent drive and steering. FIG. 7(a) shows forward wheel steering as in the vehicle in the related art, and FIG. 7(b) shows rear wheel steering. FIG. 7(c) shows four-wheel steering in which front and rear wheels are steered in opposite directions, and FIG. 7(d) shows oblique steering in which the front and rear wheels are steered in the same direction. FIG. 7(e) shows a crab movement in which a vehicle moves totally sideways, and FIG. 7(f) shows pivot steering capable of spinning in place.

In various steering modes of the vehicle, a driver experiences a situation in which an angle between a heading angle of the vehicle and a direction of movement thereof is large, unlike traditional steering in the related art, that is, steering in which there is no significant difference between the heading angle of the vehicle and the direction of movement. That is, the driver may experience a situation where the angle between a driver's line of sight and the direction of movement of the vehicle is significantly different, and thus the driver may feel anxious.

Some embodiments of the present disclosure may provide a suspension and a control method capable of relieving a driver's anxiety by securing a driver's wider field of view in steering modes where there is a large difference between the direction of movement of the vehicle and the heading angle of the vehicle, such as the oblique steering or crab steering.

SUMMARY

Some embodiments of the present disclosure may be directed to providing a suspension and a control method applicable to various steering modes in a vehicle capable of various steering modes.

Certain embodiments of the present disclosure may be also directed to securing a driver's wider field of view by controlling a suspension according to various steering modes.

Meanwhile, other objects not mentioned in the present disclosure will be additionally considered within the scope to be easily inferred from the following detailed description and effects thereof.

According to an aspect of the present disclosure, there is provided a suspension control device including a steering mode determiner configured to determine a steering mode based on a steering angle of each wheel of a vehicle, a vehicle attitude decider configured to decide an attitude of the vehicle according to the steering mode, and a suspension setter configured to control suspension settings of each of the wheels according to the decided attitude of the vehicle.

The vehicle attitude decider may determine a direction of movement of the vehicle based on the steering mode and the steering angle and decide the attitude of the vehicle so that a wider driver's field of view is secured in the determined direction of movement of the vehicle.

The vehicle attitude decider may decide the attitude of the vehicle so that the wider driver's field of view is secured only when a moving speed of the vehicle is less than or equal to a predetermined reference speed.

The vehicle attitude decider may decide a roll angle, pitch angle, or yaw angle of the vehicle according to the decided attitude of the vehicle.

The suspension setter may set the suspension of the vehicle according to the decided roll angle, pitch angle, or yaw angle of the vehicle.

The vehicle attitude decider may decide a roll angle so that the vehicle is tilted in the direction of movement of the vehicle when the steering mode is a crab steering mode, and the suspension setter may set the suspension of the vehicle according to the decided roll angle.

The vehicle attitude decider may decide a roll angle and a pitch angle so that the vehicle is tilted in the direction of movement of the vehicle when the steering mode is an oblique steering mode, and the suspension setter may set the suspension of the vehicle according to the decided roll angle and pitch angle.

The vehicle attitude decider may increase a degree to which the vehicle is tilted in the direction of movement of the vehicle as a distance from a parking position increases when the vehicle is moving in a parking mode.

The vehicle attitude decider may gradually decrease the degree to which the vehicle is tilted in the direction of movement of the vehicle as the vehicle approaches an obstacle when the obstacle is detected in the direction of movement of the vehicle when the vehicle is moving in the parking mode.

The vehicle attitude decider may increase a degree to which the vehicle is tilted in the direction of movement of the vehicle as a speed of the vehicle increases.

According to another aspect of the present disclosure, there is provided a suspension control method including determining a steering mode based on a steering angle of each wheel of a vehicle, deciding an attitude of the vehicle according to the steering mode, and controlling settings of a suspension of each of the wheels according to the decided attitude of the vehicle.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

Figure 1:
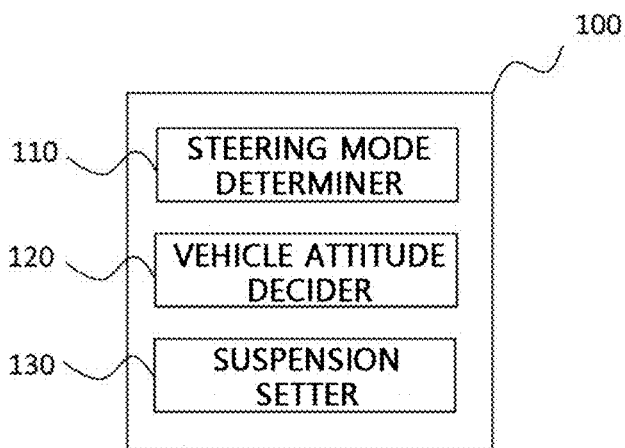
FIG. 1 is a schematic block diagram of a suspension control device according to an exemplary embodiment of the present disclosure.

It is clarified that the attached drawings are illustrated as a reference for understanding the technical concept of the present disclosure, and the scope of the present disclosure is not limited by the drawings.

DETAILED DESCRIPTION OF EXEMPLARY EMBODIMENTS

The objects and means of the present disclosure and advantages according thereto will be more obvious from the following detail descriptions with reference to the accompanying drawings, and accordingly, the technical concept of the present disclosure may be easily practiced by those skilled in the art to which the present disclosure pertains. In describing the present disclosure, when it is determined that the detailed description of the known technology related to the present disclosure may unnecessarily obscure the subject matter of the present disclosure, the detailed description thereof will be omitted.

The terms used in the present specification are for the purpose of describing the embodiments only and are not intended to limit the disclosure. In the present specification, the singular forms "a," "an," and "the" are intended to include the plural forms as well as appropriate, unless the context clearly indicates otherwise. In this specification, terms such as "comprise," "include," "provide," or "have" do not exclude the presence or addition of one or more other components other than mentioned components.

In the present specification, terms such as "or" and "at least one" may represent one of words listed together, or a combination of two or more. For example, "A or B" and "at least one of A and B" may include only A or B, or include both A and B.

In the present specification, the description following "for example" may not exactly match the information presented, such as the recited characteristics, variables or values, and the exemplary embodiments of the disclosure according to various examples of the present disclosure should not be limited to effects such as variations including tolerances, measurement errors, limitations of measurement accuracy and other commonly known factors.

In the present specification, it will be understood that when an element is described as being "coupled" or "connected" to another element, the element may be directly coupled or connected to the other element, or intervening elements may also be present. In contrast, it will be understood that when an element is referred to as being "directly coupled" or "directly connected" to another element, there are no intervening elements present.

In the present specification, it will be understood that when an element is described as being "on" or "adjacent to" another element, the element may be directly in contact with or connected to another component, or still another component may exist therebetween. In contrast, it may be understood that when an element is described as being "directly above" or "directly adjacent to" another component, still another component does not exist therebetween. Other expressions describing the relationship between elements, such as "between" and "directly between," may be interpreted in the same manner.

In the present specification, it will be understood that, although the terms "first," "second," etc. may be used to describe various elements, these elements should not be limited by these terms. In addition, the above terms should not be interpreted as limiting the order of each component, and may be used for the purpose of distinguishing one element from another element. For example, a "first element" may be named a "second element," and similarly, a "second element" may also be named a "first element."

Unless otherwise defined, all terms used in the present specification may be used as the same meaning as commonly understood by one of ordinary skill in the art to which the present disclosure pertains. In addition, it will be further understood that terms, such as those defined in commonly used dictionaries, will not be interpreted in an idealized or overly formal sense unless expressly so defined herein.

Hereinafter, one exemplary embodiment according to the present disclosure will be described in detail with reference to the accompanying drawings.

FIG. 1 is a schematic block diagram of a suspension control device according to an exemplary embodiment of the present disclosure.

A suspension control device 100 according to an embodiment of the present disclosure may include a steering mode determiner or steering mode determination module 110, a vehicle attitude decider or vehicle attitude determination module 120, and a suspension setter or suspension set module 130.

To this end, the suspension control device 100 may include a controller including one or more processors and a memory.

The memory may be configured to store various information necessary for suspension control. The information stored in the memory may include a steering angle or steering mode, information for control operation of the suspension control device 100, information on signals processed or analyzed in the suspension control device 100, program information regarding or for performing a control method, and the like, but is not limited thereto.

For example, the memory may include a hard disk type, a magnetic media type, a compact disc read only memory (CD-ROM) type, an optical media type, a magneto-optical media type, a multimedia card micro type, a flash memory type, a read only memory type, a random-access memory type, or the like depending on its type, but is not limited thereto. In addition, the memory may be a cache, a buffer, a main memory, an auxiliary memory, or a separately provided storage system depending on its purpose/location, but is not limited thereto.

The controller may perform various control operations of the suspension control device 100. For example, the controller may determine the steering mode of the vehicle based on the steering angle of the vehicle and control the suspension according to the steering mode of the vehicle. For example, the controller may include a hardware processor, a software process executed on the processor, or the like, but is not limited thereto.

The steering mode determiner 110 determines or identifies the steering mode among a plurality of steering modes based on a steering angle of each wheel of the vehicle.

Figure 7:
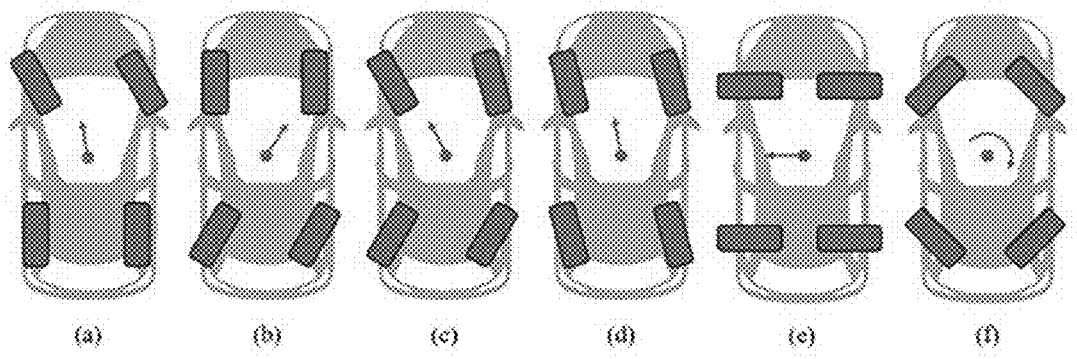
FIG. 7 shows various examples of steering modes of a four-wheel independent drive and steering vehicle.

As shown in FIG. 7, in a vehicle in which four wheels are independently driven and steered, various steering modes may be set according to the steering of each of the wheels.

Therefore, the steering mode of the vehicle may be determined by identifying the steering angle of each wheel using a steering angle sensor.

For example, when all four wheels of the vehicle form the same angle as a heading angle of the vehicle, it may be determined that the steering mode of the vehicle is an oblique steering mode. In particular, when all four wheels of the vehicle are perpendicular to the heading angle of the vehicle, it may be determined that the steering mode is a crab steering mode or a lateral steering mode.

In the oblique steering mode, the crab steering mode, or the lateral steering mode, the heading angle of the vehicle and the direction of movement form a large angle, so that the driver may feel anxious or ride quality may deteriorate.

Therefore, the suspension control device 100 according to an embodiment of the present disclosure may decide the attitude of the vehicle according to the steering mode of the vehicle and control the suspension of each wheel according to the attitude of the vehicle.

The vehicle attitude decider 120 decides the attitude of the vehicle according to the steering mode determined by the steering mode determiner 110.

For example, when the vehicle is moving, the wider a field of view of a road surface in the direction of movement, the more highly the driver evaluates the ride quality and the driving feel. Therefore, depending on the steering mode, the attitude of the vehicle is adjusted in a direction in which a wider field of view of the road surface may be secured.

Finally, the suspension setter 130 controls the suspension of the vehicle for each wheel to set the decided attitude of the vehicle. For example, by adjusting the height of the suspension, damping, and the like, the vehicle is controlled to take a pre-decided attitude.

Figure 2:
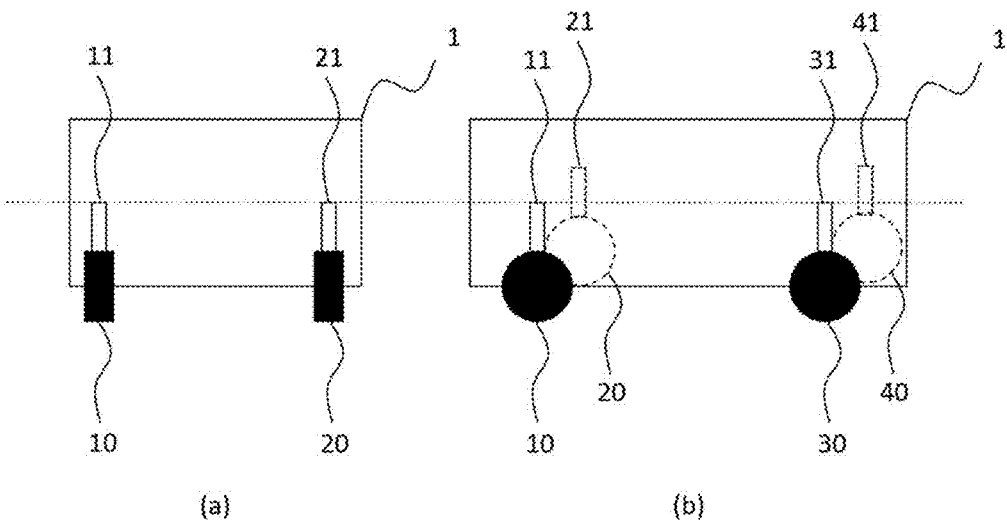
FIG. 2 is schematic structural diagrams of a vehicle controlled by the suspension control device according to an exemplary embodiment of the present disclosure.

FIG. 2 is schematic structural diagrams of a vehicle for describing suspension control of a vehicle for each steering mode.

A vehicle 1 may include four wheels 10, 20, 30, and 40 and four suspensions 11, 21, 31, and 41 connected to the four wheels, respectively.

FIG. 2(*a*) shows schematic positions of the wheels and suspensions when viewed from the rear of the vehicle, where a left front wheel 10 and a right front wheel 20 are located on the left and right, respectively.

FIG. 2(*b*) shows schematic positions of the wheels and suspensions when viewed from the left side of the vehicle.

A first suspension 11 may be connected to the lest front wheel 10, and a third suspension 31 may be connected to a left rear wheel 30.

The vehicle attitude decider 120 may determine the direction of movement of the vehicle based on the steering angle and steering mode of each wheel, and may decide the attitude of the vehicle so that a driver's wider field of view with respect to the road surface can be secured according to the determined direction of movement of the vehicle.

For example, when the vehicle is moving forward, the attitude of the vehicle may be decided to be in a forward-leaning attitude by adjusting a pitch angle of the vehicle.

To this end, the vehicle attitude decider 120 may decide the roll angle, pitch angle, or yaw angle of the vehicle depending on the steering mode and the direction of movement of the vehicle.

The suspension setter 130 controls the vehicle to have a desired attitude by adjusting the height, damping, or the like of the suspension according to the decided attitude of the vehicle. That is, the height, damping, or the like of the suspension is set to create the roll angle, pitch angle, or yaw angle of the vehicle 1 decided by the vehicle attitude decider 120.

In this case, the vehicle attitude decider 120 and the suspension setter 130 may control the attitude of the vehicle only when a moving speed of the vehicle 1 is less than or equal to a predetermined reference speed. For example, the attitude of the vehicle is controlled by settings of the suspension only when the vehicle is being parked by performing oblique driving or crab driving at a low speed, and the attitude of the vehicle is not controlled when the vehicle travels forward at high speed. This is because in the case of normal or daily driving of the vehicle on the road, there is no need to tilt the attitude of the vehicle in the direction of movement of the vehicle 1.

Figure 3:
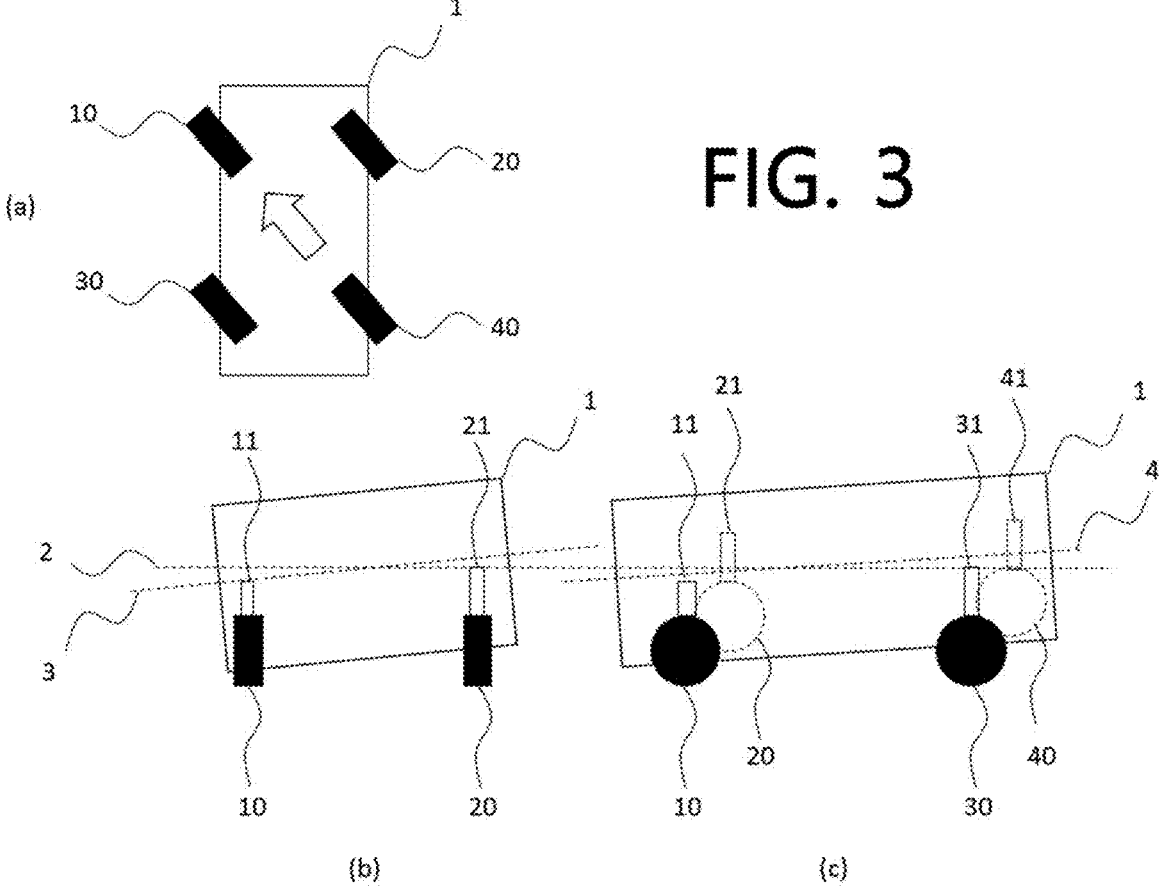
FIG. 3 shows examples of suspension control in an oblique steering mode according to an exemplary embodiment of the present disclosure.
Figure 4:
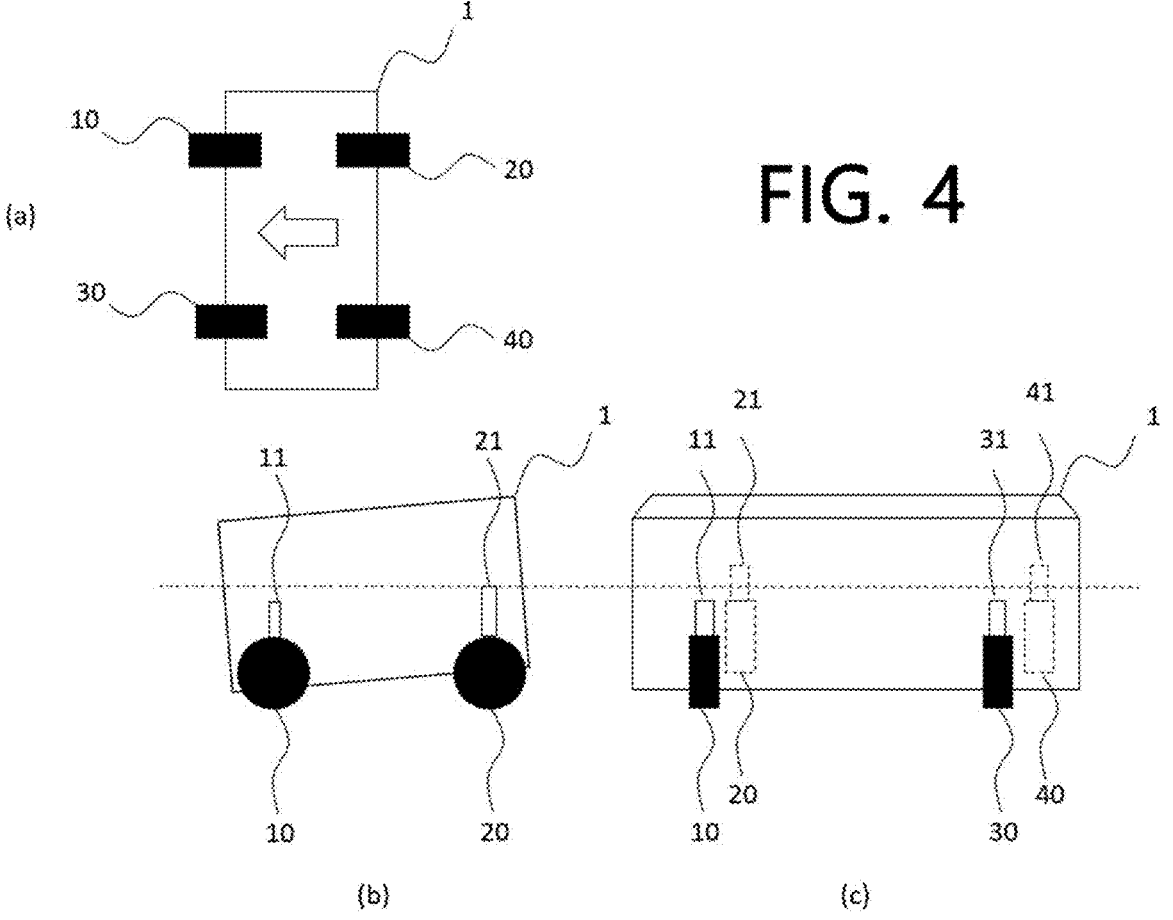
FIG. 4 shows examples of suspension control in a crab steering mode according to an exemplary embodiment of the present disclosure.

FIG. 3 and FIG. 4 are schematic structural diagrams of a vehicle for describing settings of suspensions of the vehicle in an oblique steering mode or crab steering mode according to an embodiment of the present disclosure.

As shown in FIG. 3(*a*), when the wheels 10, 20, 30, and 40 of the vehicle 1 are all facing left front, the yaw angle of the vehicle 1 does not change and the vehicle moves toward the left front. That is, the driver may feel uncomfortable because the vehicle moves in a direction different from a direction of a driver's line of sight in a state of looking forward.

Accordingly, the vehicle attitude decider 120 decides the attitude of the vehicle 1 to tilt the vehicle tilted toward the left front and thus the driver may secure a wider field of view of the road surface on the left front.

FIG. 3(*b*) shows that the vehicle 1 is tilted toward the left, which is the direction of travel of the vehicle. In other words, a left and right direction horizontal axis 3 of the vehicle forms a certain angle or is angled with respect to an axis 2 that is horizontal or parallel to the ground, therefore the roll angle of the vehicle has a constant value other than 0 degrees.

FIG. 3(*c*) shows that the vehicle 1 is tilted forward, which is the direction of travel of the vehicle. That is, a front and rear direction horizontal axis 4 of the vehicle forms a certain angle or is angled with respect to the axis 2 that is horizontal or parallel to the ground, accordingly the pitch angle of the vehicle has a constant value other than 0 degree.

In this way, when the attitude of the vehicle 1 obliquely traveling, that is, the roll angle or the pitch angle, is determined, the suspension setter 130 controls the suspensions 11, 21, 31, and 41 such that the attitude of the vehicle 1 has the determined roll angle or pitch angle.

Specifically, in order to cause the vehicle to be tilt toward the left, the height of the suspension 11 connected to the left wheel 10 may be decreased, or, conversely, the height of the suspension 21 connected to the right wheel 20 may be increased.

By controlling the suspensions 11, 21, 31, and 41 of the vehicle 1 to tilt the vehicle 1 toward the left front, a driver's wider field of view may be secured.

FIG. 4(*a*) shows an arrangement of the wheels 10, 20, 30, and 40 when the vehicle is in the crab steering mode. All four wheels 10, 20, 30, and 40 are perpendicular to the heading angle of the vehicle 1 to allow the vehicle 1 to move in a lateral direction only.

By identifying the steering angle information and driving information about the wheels 10, 20, 30, and 40, that is, the steering mode, the direction of movement of the vehicle 1 may be identified. As shown in FIGS. 4(*a*) to 4(*c*), when the vehicle 1 is moving to the left in the lateral direction, the vehicle attitude decider 120 decides the attitude of the vehicle by adjusting only the roll angle in a left direction, which is the direction of movement of the vehicle 1, without adjusting the pitch angle, which is the front-to-back inclination of the vehicle 1. In addition, the suspension setter 130 controls the suspension 11 according to the decided roll angle.

The oblique driving or crab driving as shown in the examples of FIGS. 3 and 4 may be utilized when the vehicle is traveling at low speed, for instance, when the vehicle is being parked. To this end, the vehicle attitude decider 120 or the suspension setter 130 may be set to identify the speed of the vehicle 1 and decide the attitude of the vehicle 1 only when the speed of the vehicle 1 is below a predetermined speed.

Figure 5:
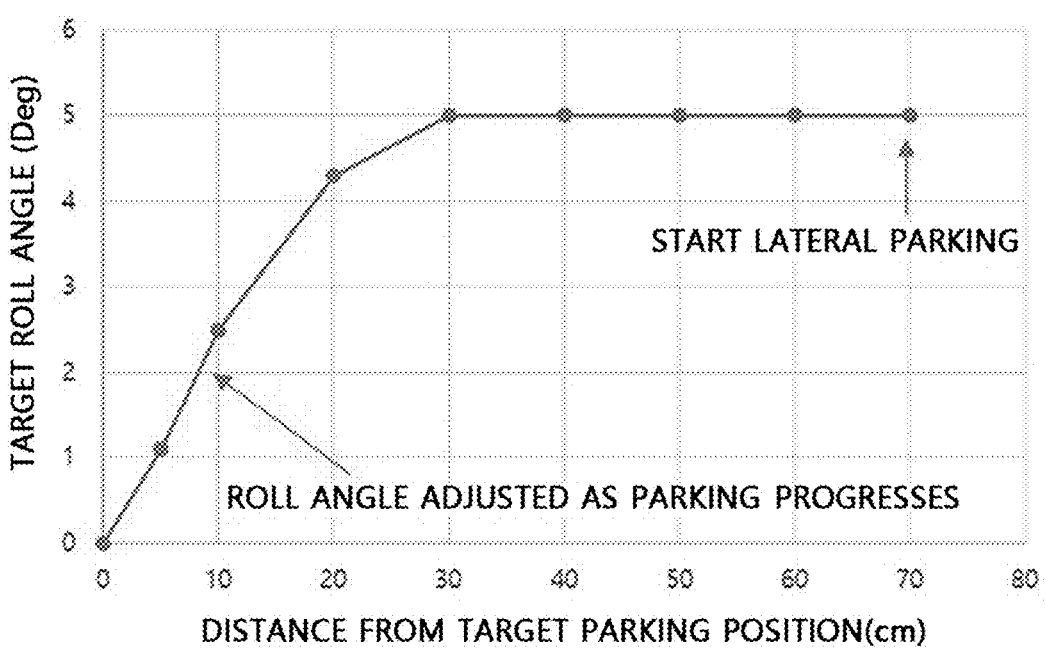
FIG. 5 is a graph showing a change in roll angle during parking according to the suspension control according to an exemplary embodiment of the present disclosure.

FIG. 5 is a graph showing an example of a correlation between a distance from a parking position and a roll angle when a vehicle is being parked.

The vehicle starts parking in a lateral (crab) steering mode, so the roll angle also decreases as the distance from the target parking position decreases. When the vehicle reaches the parking position, that is, a target parking spot, there are cases where the target roll angle converges to 0.

When the vehicle 1 is being parked, the speed of the vehicle 1 is generally decreased as the vehicle 1 gets closer to the parking position, and thus detailed control is possible. Therefore, the vehicle attitude decider 120 may increase a degree of tilt of the vehicle when the vehicle is far from the parking position and gradually decrease the degree of tilt as the vehicle gets closer to the parking position, and when the vehicle 1 is located at the parking position, the degree of tilt, that is, the roll angle, may be set to 0 degrees.

At this time, when an obstacle is discovered while the vehicle 1 is moving in the oblique steering mode or crab steering mode for parking, the roll angle or pitch angle of the vehicle may be rapidly decreased as the vehicle approaches the obstacle. Accordingly, the degree of tilt of the vehicle 1 may be decreased, and the driver will be able to identify a problem in a driving environment, for example, the obstacle, through vision or other senses.

In addition, since the faster the vehicle speed, the narrower the driver's field of view becomes, in order to secure the field of view, the vehicle attitude decider 120 may set a tilt angle of the vehicle 1 in the direction of movement of the vehicle 1 to increase as the speed of the vehicle increases. That is, the roll angle of the vehicle may be increased in proportion to the speed of the vehicle 1.

In this way, by controlling the height or damping of the suspension to secure the driver's field of view according to various steering modes of the vehicle, the driver may reduce anxiety caused by mismatch with the line of sight and gain psychological stability by securing the field of view.

Figure 6:
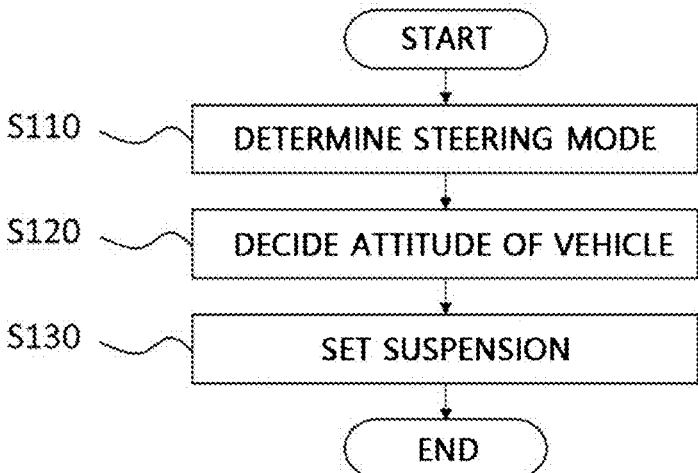
FIG. 6 is a schematic flowchart of a suspension control method according to an exemplary embodiment of the present disclosure.

FIG. 6 is a flowchart of a suspension control method according to an exemplary embodiment of the present disclosure.

A suspension control method according to an embodiment of the present disclosure may be performed by a suspension control device or controller including one or more processors and a memory.

As described above, the suspension control method according to an embodiment of the present disclosure includes determining a current steering mode among a plurality of steering modes of a vehicle (operation S110), deciding an attitude of the vehicle (operation S120), and setting a suspension according to the decided attitude of the vehicle (operation S130).

In the operation S110 of determining the steering mode, as described above, the steering mode of all four wheels is determined among the plurality of steering mode, and the steering mode is determined according to an identified steering angle of each wheel. As described above, the steering of all wheels may be identified and a driving direction may be determined accordingly.

In the operation S120 of deciding the attitude of the vehicle, the attitude of the vehicle is decided according to the direction of movement of the vehicle determined by a steering mode and a steering angle. For example, a roll angle or pitch angle of the vehicle may be decided so that the vehicle may tilt in the direction of movement of the vehicle, and the suspension may be controlled based on the roll angle or pitch angle in the next operation.

In particular, as described above, the attitude of the vehicle may be decided and the suspension may be set only when the vehicle is slowly moving, such as in the oblique steering mode or crab steering mode or a case when the vehicle is driving at a speed lower than a reference speed.

In addition, when the vehicle is moving or being operated in a parking mode, as the vehicle approaches the parking spot, a moving speed of the vehicle may be decreased or slowed down or the roll angle or pitch angle of the vehicle may be made smaller.

In this way, according to the suspension control device and method according to an embodiment of the present disclosure, the driver's anxiety or uncomfortableness may be alleviated and the ride quality can also be improved by securing a driver's wider field of view in the direction in which the vehicle is traveling according to the steering mode.

According to certain embodiments of the present disclosure, there may be an effect of securing a driver's field of view by controlling a suspension according to a steering mode.

In addition, there may be an effect that a driver can indirectly receive information on a traveling state of a vehicle by controlling the suspension according to a direction of travel of the vehicle.

In addition, there is an advantage in that stability of the vehicle can be improved even during crab steering or oblique steering, which is not the normal driving of the vehicle.

Meanwhile, it is added that, even though not explicitly described herein, an effect described in the specification below that is expected by the technical feature of the present disclosure and a temporary effect thereof will be treated as those described in the specification of the present disclosure.

Although specific embodiments have been described in the detailed description of the present disclosure, various modifications can be made without departing from the scope of the present invention. Therefore, the scope of the present invention is not limited to the described embodiments, but should be defined by the claims described below and their equivalents.

What is claimed is:

1. A suspension control device configured to:
identify a steering mode of the vehicle among a plurality of steering modes based on a steering angle of each wheel of a vehicle;
determine an attitude of the vehicle according to the identified steering mode of the vehicle;
control settings of a suspension of each wheel of the vehicle according to the attitude of the vehicle determined according to the identified steering mode of the vehicle, and
when the steering mode of the vehicle is identified as a crab steering mode among the plurality of steering modes, determine a roll angle tiling the vehicle in a direction of movement of the vehicle and set suspension of each wheel of the vehicle according to the determined roll angle tilling the vehicle in the direction of the movement of the vehicle.

2. The suspension control device of claim 1, wherein the suspension control device is configured to determine a direction of movement of the vehicle based on the identified steering mode and the steering angle of each wheel of the vehicle and determine the attitude of the vehicle to secure a wider field of view of a driver in the determined direction of movement of the vehicle.

3. The suspension control device of claim 2, wherein the suspension control device is configured to, only when a speed of the vehicle is less than or equal to a predetermined reference speed, determine the attitude of the vehicle to secure the wider field of view of the driver.

4. The suspension control device of claim 2, wherein the suspension control device is configured to determine one or more of a roll angle, a pitch angle, or a yaw angle of the vehicle according to the attitude of the vehicle determined according to the identified steering mode of the vehicle.

5. The suspension control device of claim 4, wherein the suspension control device is configured to set the suspension of each wheel of the vehicle according to one or more of the roll angle, the pitch angle, or the yaw angle of the vehicle.

6. The suspension control device of claim 1, wherein the suspension control device is configured to, when the steering mode of the vehicle is identified as an oblique steering mode among the plurality of steering modes, determine a roll angle and a pitch angle tilting the vehicle in a direction of movement of the vehicle and set the suspension of each wheel of the vehicle according to the determined roll angle and pitch angle tilting the vehicle in the direction of the movement of the vehicle.

7. The suspension control device of claim 1, wherein the suspension control device is configured to, when the steering mode of the vehicle is identified as a parking mode among the plurality of steering modes, increase a degree of tilting the vehicle in the direction of movement of the vehicle as a distance between the vehicle and a parking target position increases.

8. The suspension control device of claim 7, wherein the suspension control device is configured to, when the steering mode of the vehicle is identified as the parking mode among the plurality of steering modes, gradually decrease the degree of tilting the vehicle in the direction of movement of the vehicle as the vehicle approaches toward an obstacle when the obstacle is detected in the direction of movement of the vehicle.

9. The suspension control device of claim 1, wherein the suspension control device is configured to increase the degree of tilting the vehicle in the direction of movement of the vehicle as a speed of the vehicle increases.

10. A suspension control method performed by a suspension control device, the suspension control method comprising:
identifying a steering mode of the vehicle among a plurality of steering modes based on a steering angle of each wheel of a vehicle;
determining an attitude of the vehicle according to the identified steering mode of the vehicle; and
controlling settings of a suspension of each wheel of the vehicle according to the attitude of the vehicle determined according to the identified steering mode of the vehicle,
wherein the determining of the attitude of the vehicle comprises, when the steering mode of the vehicle is identified as a crab steering mode among the plurality of steering modes, determining a roll angle tilling the vehicle in a direction of movement of the vehicle, and the controlling of the settings of the suspension of each wheel of the vehicle comprises setting the suspension of each wheel of the vehicle according to the determined roll angle tilling the vehicle in the direction of the movement of the vehicle.

11. The suspension control method of claim 10, wherein the determining of the attitude of the vehicle comprises determining a direction of movement of the vehicle based on the identified steering mode and the steering angle of each wheel of the vehicle and determining the attitude of the vehicle to secure a wider field of view of a driver in the determined direction of movement of the vehicle.

12. The suspension control method of claim 11, wherein the determining of the attitude of the vehicle is performed to secure the wider field of view of the driver only when a speed of the vehicle is less than or equal to a predetermined reference speed.

13. The suspension control method of claim 11, wherein the determining of the attitude of the vehicle comprises determining one or more of a roll angle, a pitch angle, or a yaw angle of the vehicle according to the attitude of the vehicle determined according to the identified steering mode of the vehicle.

14. The suspension control method of claim 13, wherein the controlling of the settings of the suspension of each wheel of the vehicle comprises setting the suspension of each wheel of the vehicle according to one or more of the roll angle, the pitch angle, or the yaw angle of the vehicle.

15. The suspension control method of claim 10, wherein the determining of the attitude of the vehicle comprises, when the steering mode of the vehicle is identified as an oblique steering mode among the plurality of steering modes, determine a roll angle and a pitch angle tilting the vehicle in a direction of movement of the vehicle and the controlling of the settings of the suspension of each wheel of the vehicle comprises setting the suspension of each wheel of the vehicle according to the determined roll angle and pitch angle tilting the vehicle in the direction of the movement of the vehicle.

16. The suspension control method of claim 10, wherein the determining of the attitude of the vehicle comprises, when the steering mode of the vehicle is identified as a parking mode among the plurality of steering modes, increasing a degree of tilting the vehicle in the direction of movement of the vehicle as a distance between the vehicle and a parking target position increases.

17. The suspension control method of claim 16, wherein the determining of the attitude of the vehicle comprises, when the steering mode of the vehicle is identified as the parking mode among the plurality of steering modes, decreasing the degree of tilting the vehicle in the direction of movement of the vehicle as the vehicle approaches toward an obstacle when the obstacle is detected in the direction of movement of the vehicle.

18. The suspension control method of claim 10, wherein the determining of the attitude of the vehicle comprises increasing the degree of tilting the vehicle in the direction of movement of the vehicle as a speed of the vehicle increases.

* * * * *